US007597376B2

(12) United States Patent  
Makala et al.

(10) Patent No.: US 7,597,376 B2  
(45) Date of Patent: Oct. 6, 2009

(54) SEAT ASSEMBLY FOR A MOTOR VEHICLE

(75) Inventors: Jerome Makala, Guyancourt (FR); Dominique Cabrie, Magny les Hameaux (FR)

(73) Assignee: Renault s.a.s, Boulogne Billancourt (FR)

( * ) Notice: Subject to any disclaimer, the term of this patent is extended or adjusted under 35 U.S.C. 154(b) by 37 days.

(21) Appl. No.: 11/817,970

(22) PCT Filed: Apr. 12, 2006

(86) PCT No.: PCT/FR2006/050346

§ 371 (c)(1),
(2), (4) Date: Sep. 7, 2007

(87) PCT Pub. No.: WO2006/117487

PCT Pub. Date: Nov. 9, 2006

(65) Prior Publication Data

US 2008/0203792 A1     Aug. 28, 2008

(30) Foreign Application Priority Data

May 2, 2005     (FR) ................................... 05 04457

(51) Int. Cl.
  *B60N 2/07*     (2006.01)
  *B60N 2/42*     (2006.01)
(52) U.S. Cl. .................................. 296/65.13; 296/68.1

(58) Field of Classification Search .................... 296/67, 296/65.13, 68.1
See application file for complete search history.

(56) References Cited

U.S. PATENT DOCUMENTS

| 3,885,810 | A |   | 5/1975  | Chika |
| 3,922,029 | A | * | 11/1975 | Urai ........................ 296/68.1 |
| 2007/0075561 | A1 |   | 4/2007 | Meynet et al. |
| 2007/0108811 | A1 |   | 5/2007 | Cabrie et al. |

FOREIGN PATENT DOCUMENTS

| EP | 1 060 944 | 12/2000 |
| EP | 1 247 724 | 10/2002 |
| FR | 2 839 930 | 11/2003 |
| GB | 2 340 741 | 3/2000 |
| WO | 97 17223 | 5/1997 |
| WO | 03 057524 | 7/2003 |

* cited by examiner

*Primary Examiner*—Dennis H Pedder  
(74) *Attorney, Agent, or Firm*—Oblon, Spivak, McClelland, Maier & Neustadt, L.L.P.

(57) ABSTRACT

A seat assembly for a motor vehicle includes a central support element, fixed essentially vertically in a vehicle cabin to which the seats are fitted. The seat assembly includes connector bodies arranged at one end of the support element for fixing to a part of the cabin, the connector bodies permitting a displacement of the assembly along a longitudinal axis of the vehicle.

17 Claims, 2 Drawing Sheets

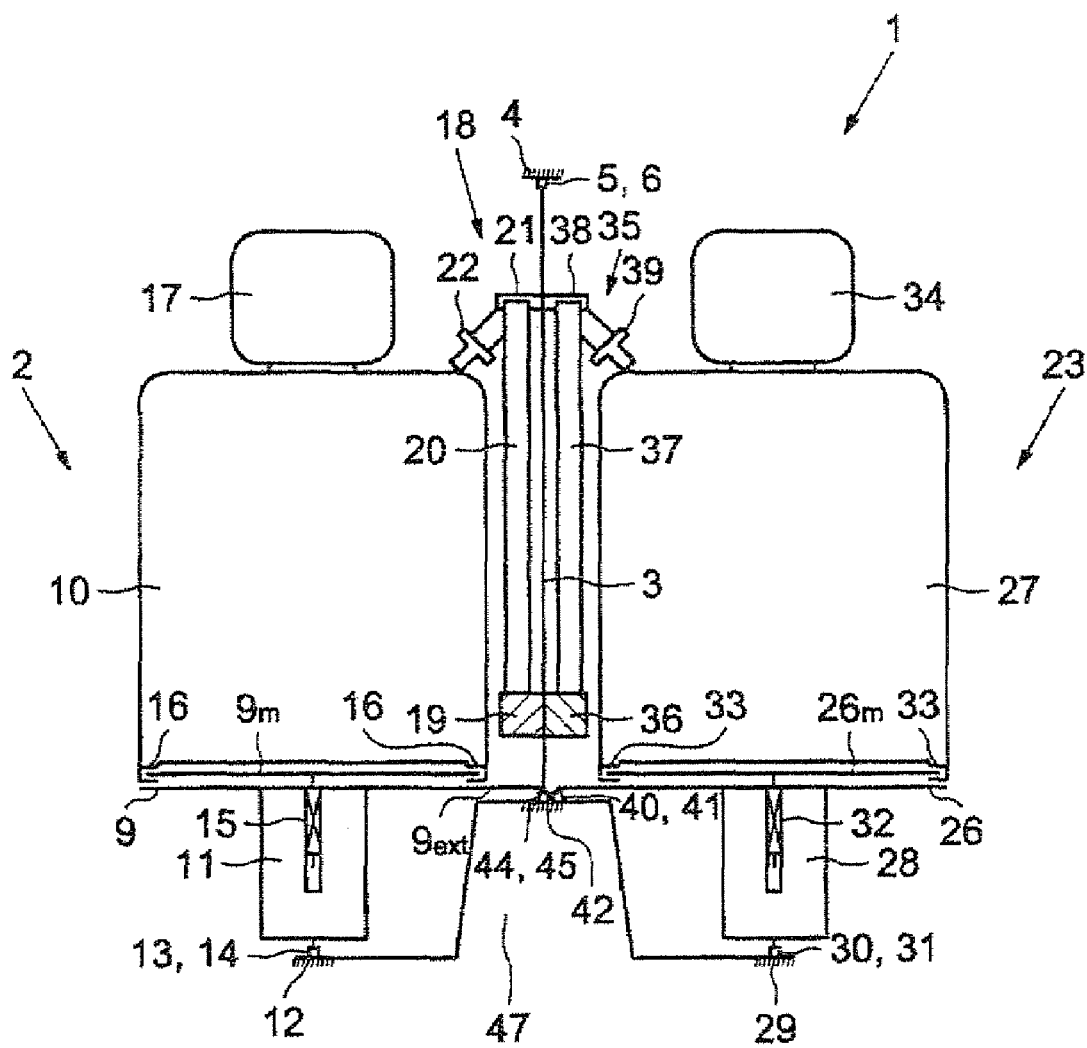

SEAT ASSEMBLY FOR A MOTOR VEHICLE

BACKGROUND OF THE INVENTION

I. Field of the Invention

The present invention relates to a seat assembly for a motor vehicle, as well as a motor vehicle fitted with such a seat assembly.

II. Description of Related Art

Motor vehicle seats, and in particular the front seats, must meet a number of requirements, in particular safety, comfort, and durability requirements.

To meet these requirements, such seats have become relatively voluminous. In fact, they have a heavy and bulky frame and hinges to withstand violent impacts caused when the motor vehicle strikes an obstacle or when the vehicle overturns. Although the presence of such voluminous frames and hinges increases the overall bulk of the seat, the rigidity of the seat remains inadequate.

There are solutions that consist in relocating the central mountings placed under the seat to side mountings under the seat, which make it possible to increase the space available for the feet of the rear passengers in the vehicle, but which do not improve the space available at the level of the knees of the rear passengers in the vehicle.

The document EP 1,247,724 describes a seat comprising an additional mounting point, which improves the strength in the event of an impact of the vehicle, and reduces the bulk of such a seat. However, the number of parts required for the construction of this seat is large, and therefore costly.

The document WO 03/057524 relates to a pair of front seats of a motor vehicle comprising a central pillar extending from the floor to the roof of the vehicle and a central support forward of the central pillar. The seat cushion, the squab, and the headrest of the two seats are connected to the central pillar by support members. Such a pair of seats does not allow any adjustment of the position of the seats, which is a real nuisance and very uncomfortable for the passengers of a motor vehicle.

BRIEF SUMMARY OF THE INVENTION

The subject of the present invention is a seat assembly for a motor vehicle, with adjustable positioning, and having a light and thin frame making it possible to limit the bulk of the vehicle while improving the rigidity and the strength of the seats, at low cost.

Therefore, according to one aspect of the invention, a seat assembly for a motor vehicle is provided, comprising a central supporting element intended to be mounted generally vertically in the passenger compartment of the vehicle, and on which said seats are mounted. The assembly comprises connecting members, disposed at one end of said supporting element and intended to be mounted on a portion of the passenger compartment. Said connecting members are able to permit a longitudinal movement of said assembly.

Such a seat assembly consequently has a light and thin frame limiting the bulk of the vehicle, while improving the rigidity and the strength of the seat, at low cost. Moreover, such an assembly allows an adjustment of the positioning of the seats.

In a preferred embodiment, at least one of the seats comprises side connecting members, disposed between said seat and said supporting element, and able to permit a longitudinal translational movement of said seat in relation to said supporting element.

It is then possible to adjust the positioning of a seat independently of the positioning of the other seats. It is in fact important that each person be able to adjust the positioning of his seat independently of the others.

Advantageously, at least one of the seats is mounted permanently on said supporting element.

The movement of the supporting element allows the adjustment of the positioning of at least one permanently mounted seat, which reduces the cost, by keeping the number of connecting members to a minimum.

In a preferred embodiment, at least one of the seats comprises first lower connecting members intended to connect the seat cushion of said seat to a lower portion of the passenger compartment.

These seats comprise two mounting points for attachment to the passenger compartment, which improves the rigidity and the strength of the seat.

In a preferred embodiment, said connecting members comprise upper connecting members, disposed at an upper end of said supporting element, and intended to be mounted on an upper portion of the passenger compartment, said upper connecting members being able to permit a movement of said assembly along a longitudinal axis of the vehicle.

In an advantageous embodiment, said connecting members moreover comprise lower connecting members, disposed at a lower end of said supporting element, and intended to be mounted on a lower portion of the passenger compartment, said lower connecting members being able to permit a movement of said assembly along a longitudinal axis of the vehicle.

A longitudinal translation of the assembly is then guided so as to reinforce the generally vertical support of the supporting element. The rigidity of the passenger compartment is then improved, because of an additional connection between the supporting element and the passenger compartment.

Moreover, at least one seat comprises a device for adjusting the vertical position of the movable seat cushion of said seat.

This seat can then be raised or lowered according to the shape and size of its occupant.

In a preferred embodiment, the assembly comprises at least one safety belt disposed on said supporting element.

According to another aspect of the invention, it provides a motor vehicle fitted with a seat assembly such as previously described.

BRIEF DESCRIPTION OF THE DRAWINGS

The present invention and its advantages will be better understood from a study of the detailed description of embodiments taken as non-limiting examples, and illustrated by figures, in which:

FIG. 3 illustrates a rear view of the seat assembly, according to FIG. 2, in a second embodiment.

DETAILED DESCRIPTION OF THE INVENTION

Figure 1:
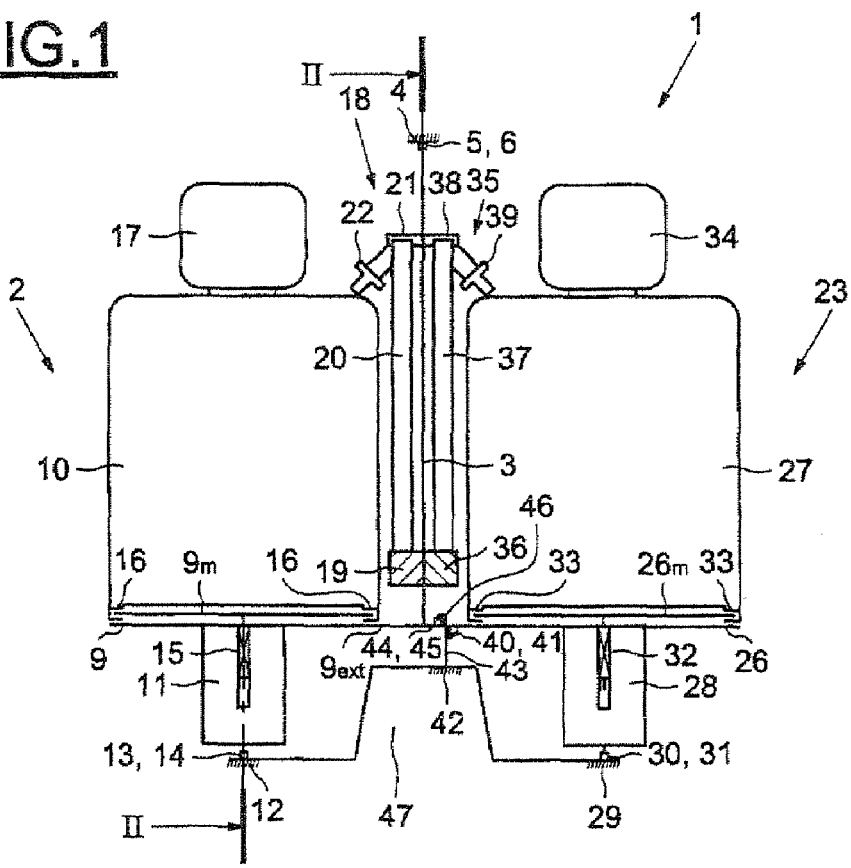
FIG. 1 illustrates a rear view of the seat assembly, according to FIG. 2, in a first embodiment.
Figure 2:
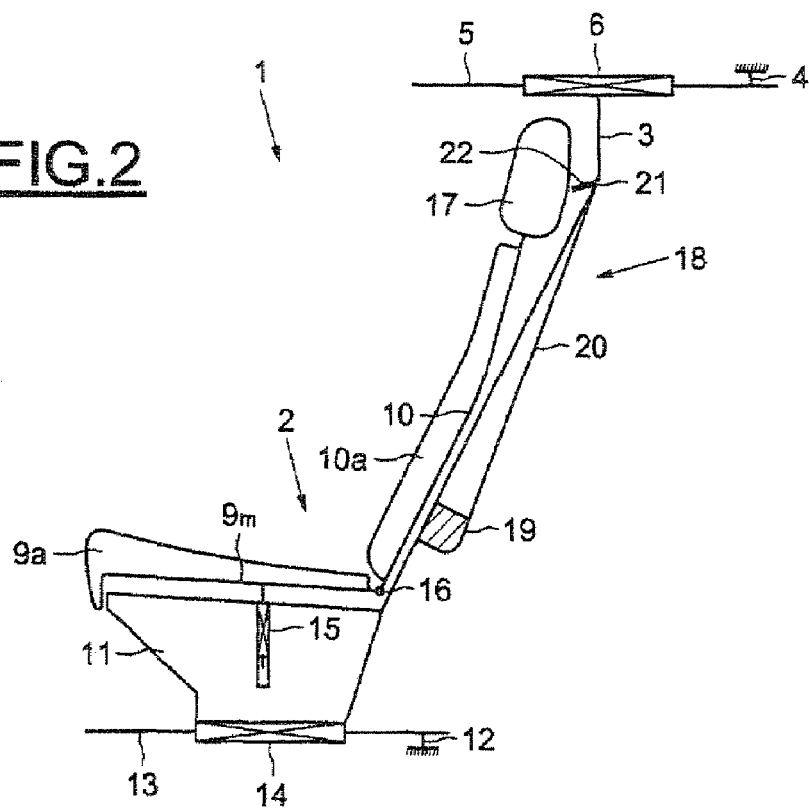
FIG. 2 illustrates a schematic longitudinal section view of a seat assembly according to one aspect of the invention.

Illustrated in FIG. 1 is a seat assembly 1 according to one aspect of the invention, comprising two seats intended to be mounted in the front of a motor vehicle, even in the center of a large-size vehicle. FIG. 2 is a cross-section view of the left-hand front seat, along the lines II-II of FIG. 1, the whole being numbered 2, taken here as a reference seat.

The seat assembly 1 comprises a central supporting element 3 intended to be mounted generally vertically in the passenger compartment of the vehicle, on which are mounted the seats. The supporting element 3 comprises upper connecting members, disposed at an upper end of the supporting element 3, and intended to be mounted on an upper portion of the passenger compartment illustrated schematically by a fixed point 4.

It will be noted, however, that the invention also applies to a supporting element 3, usually comprising connecting members intended to be mounted on a portion, for example a lower portion, of the passenger compartment.

In the rest of the description, it will be assumed that the connecting members are upper connecting members.

The upper connecting members are provided in the form of an upper runner 5 and an upper slider 6 connected to the supporting element 3 and able to slide on the upper runner 5 connected to an upper portion 4 of the passenger compartment. The upper slider 6 can be moved longitudinally forward or backward in relation to the upper portion 4 of the passenger compartment. Of course, the slider 6 is able to be locked in position on the upper runner 5 or unlocked.

The seat 2 is here mounted on the supporting element 3 by means of an extension arm 9ext of the seat cushion 9 of the left-hand front seat 2.

The left-hand front seat 2 comprises a frame including a movable seat cushion portion 9m extending generally horizontally while being slightly inclined toward the rear, and a squab portion or backrest portion 10 extending generally vertically while being generally inclined toward the rear. The movable seat cushion portion 9m and the squab portion 10 are respectively covered with padding or trim 9a and 10a.

The seat cushion portion 9 of the frame comprises a central mounting or base 11. The base 11 has an upper end fixed to the seat cushion portion 9 and a lower end fixed to first lower connecting members intended to connect the seat cushion portion 9 of the seat 2 to a lower portion of the passenger compartment illustrated schematically by a fixed point 12.

The first lower connecting members of the left-hand front seat 2 are provided in the form of a first lower runner 13 and a first lower slider 14 connected to the seat cushion portion 9 and able to slide on the first lower runner 13 connected to a lower portion 12 of the passenger compartment. The first lower slider 14 can be moved longitudinally forward or backward in relation to the lower portion 12 of the passenger compartment. Of course, the first lower slider 14 can be locked in position on the first lower runner 13 or unlocked.

The movable seat cushion portion 9m comprises moreover a device for adjusting 15 its vertical position, located under the movable seat cushion 9m, generally at its center.

The squab portion 10 and the movable seat cushion portion 9m are connected by hinge pins 16. The upper end of the squab portion 10 comprises a headrest 17.

The assembly 1 also comprises a safety belt 18 disposed on the supporting element 3 and intended for the occupant of the left-hand front seat 2. The safety belt 18 comprises a retractor 19 installed in a bottom portion of the supporting element 3, and a strap 20. The strap 20 coming out of the retractor 19 rises along the supporting element 3 to a guide loop 21 mounted on the supporting element 3 level with the headrest 17. The strap 20 passes through the guide loop 21 and comprises a buckle 22 at one end away from the retractor 19. The buckle 22 is held at the end of its travel on the guide loop 21 by the tension exerted by the retractor 19 on the strap 20.

Illustrated in FIG. 1 is, moreover, a right-hand front seat 23 of the two-seat assembly 1. In this example of an assembly comprising two seats, the left-hand front seat 2 is connected to the supporting element 3, or, in others words, is mounted permanently on the supporting element 3. The right-hand front seat 23, like the left-hand front seat 2, is mounted on the supporting element 3 by means of side connecting members disposed between the right-hand front seat 23 and the supporting element 3, at the level of the seat cushion 26. The side connecting members are able to permit a longitudinal translational movement of the right-hand front seat 23 in relation to the supporting element 3.

In like manner, the right-hand front seat comprises one movable seat cushion portion 26m and one squab portion or backrest portion 27. The movable seat cushion portion 26m and the squab portion 27 are respectively covered with padding or trim. The seat cushion portion 26 of the frame comprises a central mounting or base 28. The base 28 has a lower end fixed to first lower connecting members intended to connect the seat cushion 26 of the seat 23 to a lower portion of the passenger compartment illustrated schematically by a fixed point 29.

The first lower connecting members of the right-hand front seat 23 are also provided in the form of a first lower runner 30 and a first lower slider 31 connected to the seat cushion portion 26 and able to slide on the first lower runner 30 connected to a lower portion 29 of the passenger compartment. The movable seat cushion portion 26m comprises moreover a device for adjusting 32 its vertical position.

The squab portion 27 and the movable seat cushion portion 26m are connected by hinge pins 33. The upper end of the squab portion 27 comprises a headrest 34.

The assembly 1 also comprises a safety belt 35 disposed on the supporting element 3 and intended for the occupant of the seat 23. The safety belt 35 comprises, like the belt 18, a retractor 36, a strap 37, a guide loop 38, and a buckle 39.

Of course, the connections which are able to allow a movement of one element in relation to another can be locked in position or unlocked.

The left-hand front seat 2 is mounted permanently on the supporting element 3, while the right-hand front seat 23 comprises side connecting members, disposed between the right-hand front seat 23 and the supporting element 3, and able to permit a longitudinal translational movement of the right-hand front seat 23 in relation to said supporting element 3.

The side connecting members which connect the right-hand front seat 23 with the supporting element 3 are also provided in the form of a runner 40, and a slider 41 connected to the seat cushion portion 26 and able to slide on the runner 40.

It is then possible to adjust independently the positioning of the left-hand front seat 2 and right-hand front seat 23. In a variant, the right-hand front seat 23 can be connected to the supporting element 3, and the left-hand front seat 2 can be moved by longitudinal translation in relation to the supporting element 3.

Moreover, the supporting element 3 comprises second lower connecting members, disposed at a lower end of the supporting element 3, and intended to be mounted on a lower portion of the passenger compartment illustrated schematically by a fixed point 42, by means of a peg 43. The lower connecting members of the supporting element 3 are able to permit a movement of said assembly 1 along the longitudinal axis of the vehicle.

The lower connecting members of the supporting element 3 are also provided in the form of a runner 44, and a slider 45 connected to the seat cushion portion 9 and able to slide on the runner 44.

The peg 43 prevents translation of an interface 46 between the runners 40 and 44.

The fixed point 42 to which the peg 43 is connected, is here part of a tunnel 47.

FIG. 3 illustrates a variant, in which the runners 40 and 44, as well as the associated sliders 41 and 45, are directly fixed to the fixed point 42, without the presence of a peg 43, nor is there an interface 46 between the runners 40 and 44.

The invention makes it possible to reduce the bulk of a motor vehicle, and increase the rigidity of the seats in the event of an impact, all at low cost.

The invention makes it possible to conserve the usable space in a passenger compartment of a motor vehicle, in particular for rear passengers. The seat can be used to strengthen the whole structure of the motor vehicle.

The invention claimed is:

1. A seat assembly for a motor vehicle, comprising:
a central supporting element configured to be mounted generally vertically in a passenger compartment of the vehicle;
seats mounted on the central supporting element;
assembly connecting members disposed at one end of the central supporting element, the connecting members configured to permit a movement of the assembly along a longitudinal axis of the vehicle;
first side connecting members disposed between a first one of the seats and the supporting element, and configured to permit a longitudinal translational movement of the first one of the seats in relation to the supporting element; and
first lower connecting members positioned on a lower portion of the passenger compartment and connected to the first one of the seats including the first side connecting members, and the first lower connecting members being configured to permit the longitudinal translational movement of the first one of the seats in relation to the lower portion of the passenger compartment.

2. The assembly as claimed in claim 1, wherein at least one of the seats is mounted permanently on the supporting element.

3. The assembly as claimed in claim 1, wherein the first lower connecting members are configured to connect a seat cushion of the first one of the seats to the lower portion of the passenger compartment.

4. The assembly as claimed in claim 1, wherein the assembly connecting members comprise upper assembly connecting members disposed at an upper end of the supporting element, and the upper assembly connecting members are configured to be mounted on an upper portion of the passenger compartment and to permit the movement of the assembly along the longitudinal axis of the vehicle.

5. The assembly as claimed in claim 4, wherein the assembly connecting members further comprise lower assembly connecting members disposed at a lower end of the supporting element, and the lower assembly connecting members are configured to be mounted on the lower portion of the passenger compartment and to permit the movement of the assembly along the longitudinal axis of the vehicle.

6. The assembly as claimed in claim 1, wherein at least one of the seats comprises a device for adjusting a vertical position of a movable seat cushion of the seat.

7. The assembly as claimed in claim 1, further comprising at least one safety belt disposed on the supporting element.

8. The assembly as claimed in claim 1, further comprising:
a second one of the seats fixed to the supporting element; and
second lower connecting members disposed between the second one of the seats and the lower portion of the passenger compartment, and configured to permit a longitudinal translational movement of the second one of the seats in relation to the lower portion of the passenger compartment.

9. The assembly as claimed in claim 1, wherein the assembly connecting members are disposed at the lower portion of the passenger compartment and at an upper portion of the passenger compartment to connect the central supporting element to the lower portion and the upper portion of the passenger compartment.

10. A seat assembly for a motor vehicle, comprising:
a central supporting element configured to be mounted generally vertically in a passenger compartment of the vehicle, and the central supporting element includes assembly connecting members such that the central supporting element is configured to move with respect to the passenger compartment;
two seats mounted directly on the passenger compartment via lower connecting members such that the two seats are configured to move independently with respect to the passenger compartment, and the two seats are mounted on the central supporting element via side connecting members such that one of the two seats is configured to move independently with respect to the central supporting element and the passenger compartment.

11. The assembly as claimed in claim 10, wherein the assembly connecting members are configured to allow the central supporting element to move in a longitudinal direction with respect to the passenger compartment.

12. The assembly as claimed in claim 11, wherein the side connecting members are configured to allow the one of the two seats to move in a longitudinal direction with respect to the central supporting element.

13. The assembly as claimed in claim 12, wherein the lower connecting members are configured to allow the two seats to move in a longitudinal direction with respect to the passenger compartment.

14. The assembly as claimed in claim 10, wherein each of the two seats includes a seat cushion and a base, and the base connects the seat cushion to a lower portion of the passenger compartment via the lower connecting members.

15. The assembly as claimed in claim 10, wherein the assembly connecting members connect the central supporting element to an upper portion and a lower portion of the passenger compartment.

16. The assembly as claimed in claim 10, wherein each of the two seats comprises a device for adjusting a vertical position of a movable seat cushion.

17. The assembly as claimed in claim 10, further comprising at least one safety belt disposed on the central supporting element.

\* \* \* \* \*